May 28, 1968   R. MANDLER   3,385,088
METHOD FOR THE PRODUCTION OF COMPACT INJECTION MOLDING TOOLS
Filed Nov. 6, 1964
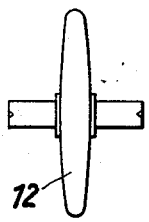
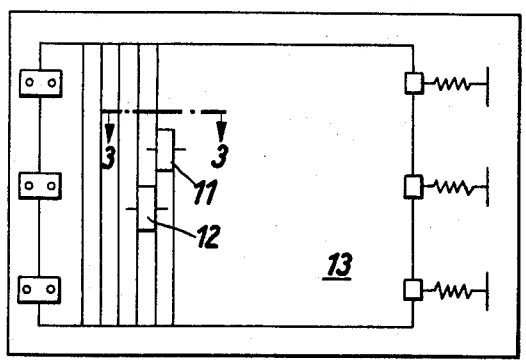
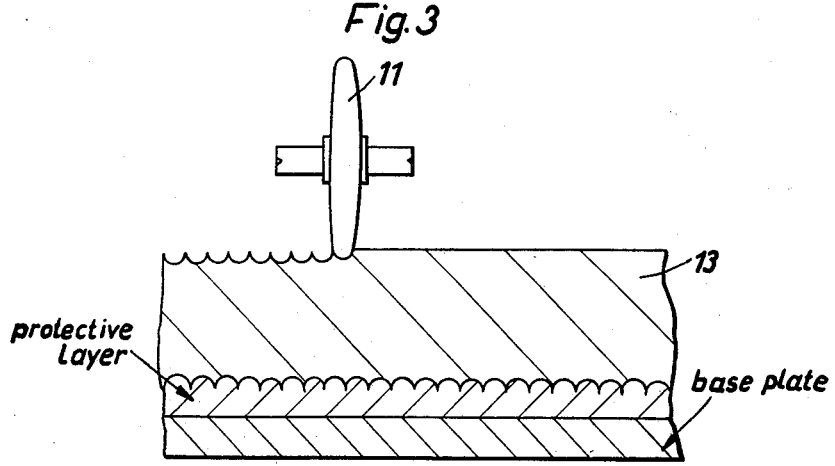
Inventor:
Rudolf Mandler

United States Patent Office 3,385,088
Patented May 28, 1968

3,385,088
METHOD FOR THE PRODUCTION OF COMPACT INJECTION MOLDING TOOLS
Rudolf Mandler, Berlin-Halensee, Germany, assignor to Interdia GmbH, Zug, Switzerland
Filed Nov. 6, 1964, Ser. No. 409,617
Claims priority, application Germany, Nov. 7, 1963, D 42,911
1 Claim. (Cl. 72—46)

ABSTRACT OF THE DISCLOSURE

Disclosed is a method of forming a molding tool used for producing cylinder lens screens from thermo-plastic material. A molding tool in the form of a steel plate of several centimeters thickness is first embossed on one side and that side is then covered with a removable pressure resistant layer. Then the other side is embossed in a similar and preferably identical manner. The protective layer on the first side may be subsequently removed if desired. More accurate screens are obtained since the tool is subjected to practically equal embossing forces on both sides.

---

The invention deals with the problem of manufacturing plate-shaped plastic blanks with fine-profiled surface, as they are required for frame change pictures or so-called panorama-stereo pictures, with the necessary high profile accuracy in a cheap mass production.

Particularly suitable for this purpose is the injection molding technique, since it ensures a high molding accuracy with a high quantity output. Accordingly the invention deals in the stricter sense with the manufacture of molding tools with which the surface profiling or lenticulation of the plate-shaped plastic blanks, for example, screens, can be obtained.

Since in frame change pictures two or a few, and in panorama stereo pictures twenty or even more different elementary pictures must be accommodated in the range of each individual screen cylinder lens, a satisfactory separation of the telescoped total pictures can only be achieved if the individual lens picture elements have maximum accuracy with regard to curvature of radius, surface smoothness and uniformity of pitch.

This problem was already solved by the inventor for metal dies of sheet thickness for embossing lenticular screens according to German Patent No. 1,102,557 in this way that the individual adjoining screen grooves were embossed successively by means of an embossing wheel and copying wheel into the workpiece of sheet metal, which yields laterally to the deformation pressure, the workpiece being clamped on the side where the embossing starts and put under tensile stress in a direction transverse to the grooves. This way it is possible to obtain an accurately screened plane working surface.

In itself it should be expected that compact workpieces, as they are used for injecting molded parts, would absorb within the material the lateral compression components which occur in surface embossing by means of the embossing wheel. Actually, however, it was found that even workpieces of several centimeter thickness, of tough material, like steel, are deformed transverse to the direction of the grooves, namely bent cylindrically curved. Such a curved molding surface, however, yields only correspondingly concave lenticular screens with varying material thickness over the surface. These screens are unsuitable, particularly for panorama-stereo pictures, since the focal lines of all picture elements must lie in one plane, namely the plane of the image carrier, which require a uniform vertex of all screen lines, that is, a uniform general thickness of the screen. The imaginable alternative of bringing the screen into plane position by corresponding chucking, fails in practice.

The invention shows an effective way of providing even compact steel plates by means of wheel embossing with a plane, fine-grooved molding surface.

Accordingly the invention consists of the method for the production of compact injection molding tools for the manufacture of plate-shaped blanks with fine-profiled surface, particularly cylinder lens screens, from thermoplastic material, whose characteristic consists in that the blank, consisting of a compact steel plate of several centimeter thickness, for example, is subjected to practically uniform embossing forces in size and direction both on the molding working surface and on the opposite surface. The lateral displacement forces, which cause the above-mentioned curving tendency, then cancel each other, and the workpiece obtains the desired plane working surface. The embossing profiles produced on the working surface and on the opposite surface need not be principally completely equal. But care should be taken that the sums of the lateral displacement forces acting on one or the other surface are practically equal over the width of the surface. If two equal profiles are selected, it is possible to use the opposite surface too, if necessary, as a working surface, thus utilizing its machining in an effective manner.

It is therefore one object of this invention to provide an improved method for producing compact injection molding tools for use in the manufacture of plate-shaped blanks with fine-profiled surfaces.

Another object of this invention is to provide an improved molding tool for making articles such as cylinder lens screens from thermoplastic material.

These and further objects and advantages of the invention will be more apparent upon reference to the following specification, claim and appended drawings wherein:

FIGURE 1 illustrates apparatus for making an injection molding tool in accordance with the present invention.

FIGURE 2 is an enlarged view showing the details of the copying wheel of FIGURE 1.

FIGURE 3 is a diagrammatic view taken along line 3—3 of FIGURE 1, illustrating the action of the embossing wheel of that figure.

Referring to the drawings, in FIGURE 1 a flat plate 13 is acted upon by an embossing wheel 11 and follower wheel 12 in a known manner as more fully set forth in German Patent DAS 1,102,557. The plate 13 in its finished form is a tool for use in injection molding and may be used to injection mold lenticular screens from suitable thermoplastic material. FIGURE 3 illustrates the action of the embossing wheel 11 and illustrates that the tool 13 of the present invention is embossed on both sides with one embossed surface covered by a protective layer. As in FIGURE 3, the second surface may be embossed by the wheel 11 while the tool is placed against a base plate. The embossings on the first surface of the tool are protected from the base plate by the intermediate protective layer illustrated in FIGURE 3.

A preferred embodiment of the invention consists in embossing the tool blank on one surface in known manner by means of a correspondingly profiled disc wheel and a trailing copying wheel in adjacent tracks, cover the embossed surface with a removable, pressure-resistant protective layer, then embossing the opposite surface with a similar or identical disc wheel plus copying wheel in tracks on the other side, and finally in removing, if necessary, the protective layer applied first.

But the track embossing can also be carried out simultaneously on both sides of the blank or in periodic alternation, by passing the blank, for example, in lateral guides between the two pairs of wheels or, if the blank is clamped on one side, arranging the wheels transverse to the surface to be machined.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:

1. Method for the production of compact injection molding tools for the manufacture of plate-shaped blanks with fine-profiled surface, particularly cylinder lens screens, from thermo-plastic material, characterized in steps such that the blank is first embossed on one surface in known manner by means of a correspondingly profiled disc wheel with trailing copying wheel in adjacent tracks, that the embossed surface is covered with a removable, pressure-resistant protective layer, that the opposite surface is then treated with a similar or identical disc wheel plus copying wheel in tracks parallel to the tracks on the other side, and that finally the protective layer, applied on the first embossed surface, is removed, if necessary, characterized further that the compact blank consists of a steel plate of several centimeters thickness and is subjected both on the working surface and on the opposite surface to embossing forces which are practically equal in size and direction.

References Cited

UNITED STATES PATENTS

| | | | |
|---|---|---|---|
| 3,089,235 | 5/1963 | Boulet et al. | 29—527 |
| 3,114,201 | 12/1963 | Boccaccio et al. | 29—424 |
| 1,338,468 | 4/1920 | Tsanoff | 249—187 |
| 3,075,261 | 1/1963 | White | 249—187 |
| 1,886,396 | 11/1932 | Hainlen | 29—527 |
| 1,915,022 | 6/1933 | Kempf | 249—187 |
| 1,955,572 | 4/1934 | Adler et al. | 29—527 |
| 2,195,741 | 4/1940 | Scott | 29—148 |

FOREIGN PATENTS 809,739  12/1936  France.

RICHARD J. HERBST, *Primary Examiner.*

W. H. JUST, E. M. COMBS, *Assistant Examiners.*